May 18, 1937.　　　C. A. PHILLIPS　　　2,081,064
TIRE CONDITION INDICATOR
Filed March 10, 1936　　　2 Sheets-Sheet 1

Inventor
C. A. Phillips

By Clarence A. O'Brien and
Hyman Berman
Attorneys

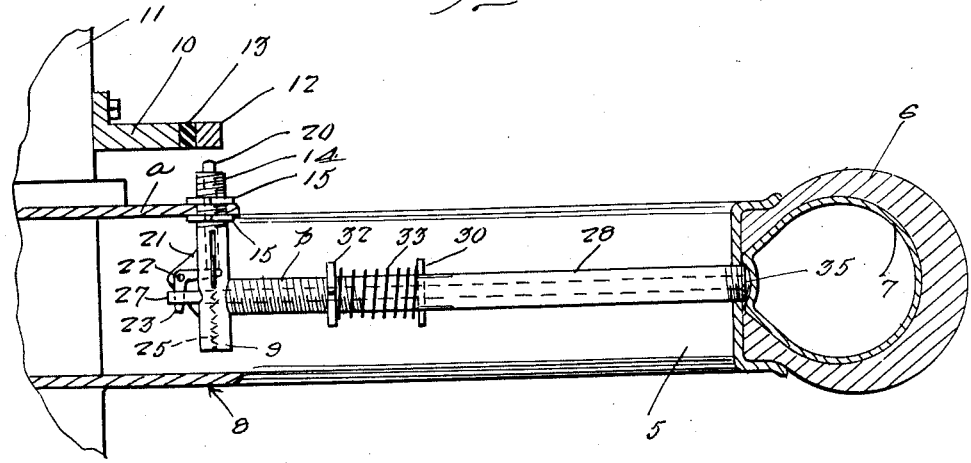
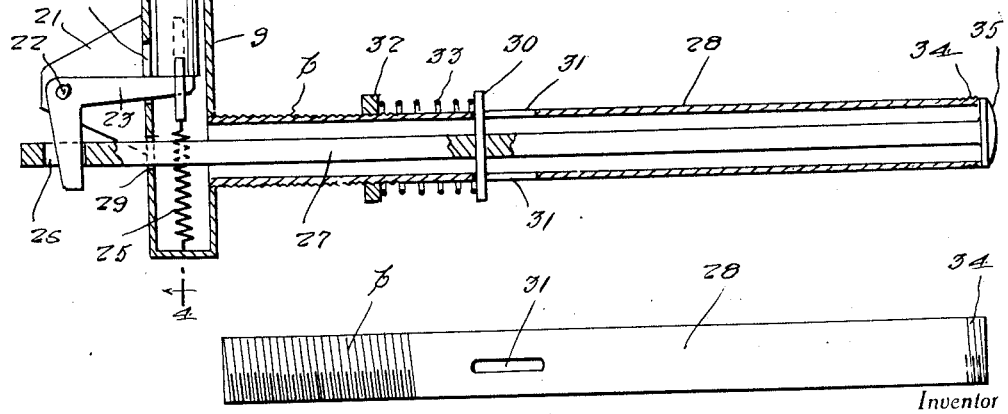

Patented May 18, 1937

2,081,064

UNITED STATES PATENT OFFICE 2,081,064

TIRE CONDITION INDICATOR

Charlie A. Phillips, Ness City, Kans.

Application March 10, 1936, Serial No. 68,129

2 Claims. (Cl. 200—58)

This invention relates to new and useful improvements in the art of electrical signalling and more particularly to a pneumatic wheel deflation indicator.

An important object of the invention is to provide a signal for land vehicles which in operation will indicate to the operator of the vehicle the deflated condition of any one of its vehicle wheels.

Another important object of the invention is to provide a pneumatic wheel deflation indicator which will be automatic in operation and which can be conveniently installed on conventional wheel constructions.

These and various other important objects and advantages of the invention will become apparent to the reader of the following specification.

In the drawings:

Figure 2 is an enlarged fragmentary detailed sectional view taken substantially on line 2—2 of Figure 1.

Figure 3 is an enlarged longitudinal sectional view through the deflation responsive means of the switch.

Figure 5 is a side elevational view of the plunger rod barrel.

Figure 1:
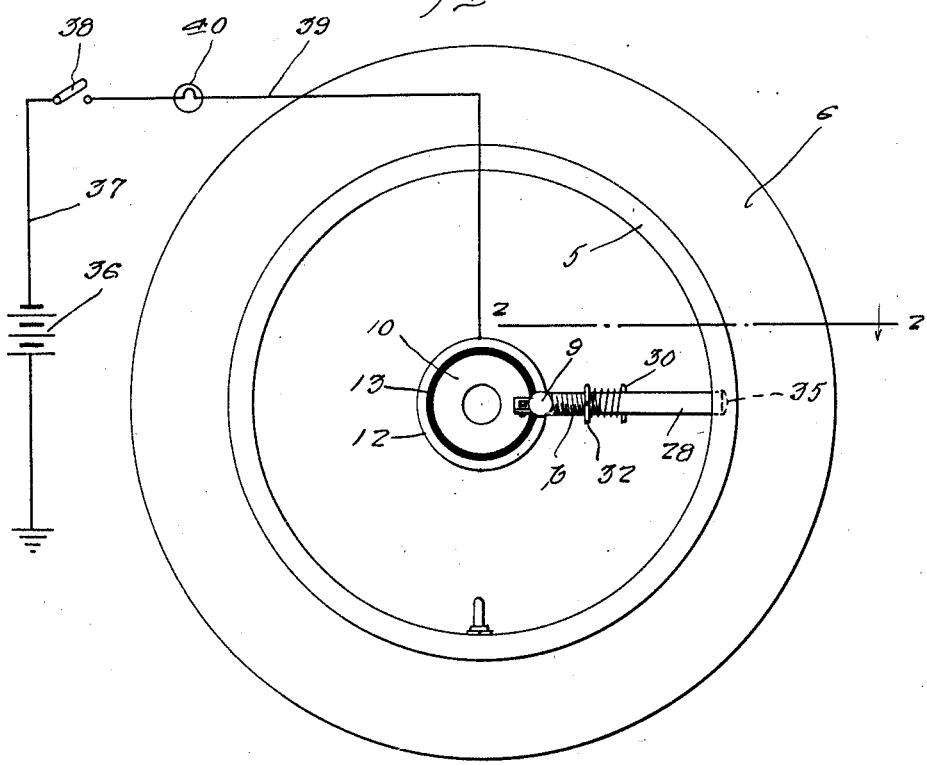
Figure 1 represents a side elevational view of a pneumatic wheel showing the switch means installed thereon and the electrical means for effecting a signal.

Referring to the drawings wherein like numerals designate like parts, it can be seen that numeral 5 represents a rim of a pneumatic wheel, while numeral 6 is the casing held by the rim 5. In the casing 6 is the usual pneumatic tube 7.

Referring to Figure 2, it can be seen that numeral 8 represents the hub structure of the wheel, through the rear wheel a of which is disposed the tube 9, projecting in the direction of the annulus 10 which is secured to the axle 11. Circumferentially disposed around this annulus 10 is the conductor ring 12 insulated from the annulus by the insulation 13. The tube 9 is provided with a threaded portion 14 and jamb nuts 15 on the threaded portion 14 of tube 9 at opposite sides of the hub plate a serves to retain this tube 9 in the definite position shown in Figure 2.

Figure 4:
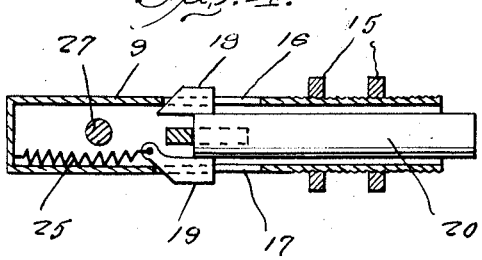
Figure 4 is a sectional view on line 4—4 of Figure 3.
Figure 6:
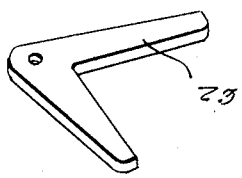
Figure 6 represents a perspective view of the bell crank.

As is seen in Figure 4, the tube 9 is provided with short longitudinally extending slots 16—17 at diametrically opposite side portions thereof through which project the guide lugs 18—19 on the contact rod 20 which is slidably disposed in the tube 9.

A wing member 21 projects laterally from the tube 9 and by a pivot pin 22 supports the bell crank 23, one leg of which projects through the additional slot 24 in the tube 9 to engage against the outboard end of the contact plunger 20. A coiled extensible spring 25 has one end connected to the lug 19 and the other end to the outboard end of the tube 9 for holding the contact plunger 20 disposed away from the conductor ring 12 and against the last mentioned end of the bell crank 23.

The opposite end of the bell crank 23 extends into the slot 26 at the hub end of the elongated rod 27 which is slidably disposed through the barrel 28 and through an opening 29 in the tube 9.

To prevent rotation of the rod 27, the rod is provided with a cross pin 30 which extends through longitudinal slots 31 in the barrel 28. The barrel 28 is provided with a threaded portion b on which is a nut 32. Interposed between this nut 32 and the end portion of the cross pin 30 is a coiled compressible spring 33 which serves to urge the rod 27 in a direction toward the pneumatic tube 7. The pneumatic tube end portion of the barrel 28 is provided with a threaded portion 34 which threads into an opening in the rim 5. The pneumatic tube end of the rod 27 is provided with a disk like head 35 which bears against the pneumatic tube 7 as is clearly shown in Figure 2.

Now referring to Figure 1, it can be seen that numeral 36 represents the source of current from which the lead 37 extends to a manual switch 38. From this switch 38 a conductor 39 extends to connect to the ring 12 and in this conductor line 39 is the signal light 40 which is preferably located adjacent the driver's seat. As a matter of fact, there may be four of these signal lights, one for each of the wheels of a four-wheeled vehicle.

It can now be seen, that normally, the contact plunger 20 is held away from the conductor ring 12 by the pressure of the air in the inner tube 7. However, when this tube becomes deflated to a dangerous degree, the spring 33 will urge the rod 27 and the disk 35 into the casing 6 and this will result in a rocking of the bell crank 23 and a resulting urge of the contact plunger 20 inboardly until it engages the conductor ring 12. This grounds the signal circuit shown in Figure 1 and results in the energization of the signal lamp 40.

While the foregoing specification sets forth the invention in specific terms, it is to be understood that numerous changes in the shape, size and materials may be resorted to without departing from the spirit or scope of the invention as claimed hereinafter.

Having thus described the invention, what is claimed as new is:

1. A pneumatic wheel switch comprising a conductor ring, means for attaching the conductor ring to a wheel axle, a plunger rod, spring means for urging the plunger rod against an inflated pneumatic tube, a movable contactor movable for engagement with the conductor ring, means consisting of a bell crank pivotally mounted and having one end engaging the movable contactor and the other end engaged with the said plunger, said plunger being provided with a slot therein for receiving the last mentioned end of the bell crank, spring means for retaining the movable contactor away from the conductor ring, a tubular guide for the movable contactor, said tubular guide being provided with slots therein, and guide members extending from the movable contactor and being ridable in the said slot.

2. A pneumatic wheel switch comprising a conductor ring, means for securing said ring to a wheel axle, a T-shaped conduit, the free end of the longer arm of said conduit terminating adjacent the inner side of a pneumatic tube and being secured to the wheel, a rod slidable in the longer arm having one end terminating adjacent the inner surface of the tire and the other end projecting through a slot in the side of the shorter arm of the T-shaped conduit and being provided with a longitudinally extending slot, resilient means normally urging said rod into pressured contact with the inner tube, a plunger slidable in the shorter conduit arm, the free end thereof projecting beyond said conduit for cooperation with said ring, the sides of said shorter conduit arm having oppositely disposed slots therein, guide lugs on the plunger slidable in said slot, resilient means normally urging said plunger inwardly, a laterally extending support on the shorter conduit arm, a bell crank pivoted thereon, one arm of the bell crank extending through a slot in the shorter conduit and cooperating with the inner end of the plunger for urging the plunger outwardly, the other arm of the bell crank extending through the slot in the projected end of the rod.

CHARLIE A. PHILLIPS.